(12) United States Patent
Lin

(10) Patent No.: US 8,398,288 B1
(45) Date of Patent: Mar. 19, 2013

(54) LED DISPLAY FRAME STRUCTURE

(75) Inventor: Chih-Cheng Lin, Taichung (TW)

(73) Assignee: Giantech Industries Co., Ltd., Taichung (TW)

( * ) Notice: Subject to any disclaimer, the term of this patent is extended or adjusted under 35 U.S.C. 154(b) by 0 days.

(21) Appl. No.: 13/438,076

(22) Filed: Apr. 3, 2012

(51) Int. Cl.
*F21V 7/04* (2006.01)
*F21V 29/00* (2006.01)

(52) U.S. Cl. ........ 362/612; 362/613; 362/622; 362/634; 362/294

(58) Field of Classification Search .................. 362/612, 362/613, 621–623, 632–634, 294, 373; 349/58, 349/62, 65
See application file for complete search history.

(56) References Cited

U.S. PATENT DOCUMENTS

| 7,275,851 | B2 * | 10/2007 | Sakurai | 362/612 |
| 7,855,761 | B2 * | 12/2010 | Watanabe et al. | 349/58 |
| 2012/0033447 | A1 * | 2/2012 | Hashino | 362/612 |

* cited by examiner

*Primary Examiner* — Thomas Sember
(74) *Attorney, Agent, or Firm* — Jackson IPG PLLC

(57) ABSTRACT

An LED display frame structure includes a light guide plate and a heat dissipation frame. The heat dissipation frame is mounted around the periphery of the light guide plate. At least one side of the light guide plate is provided with an LED strip and a 7-like heat dissipation plate. The back of the LED strip is provided with a two-sided adhesive strip to be attached to a groove of the 7-like heat dissipation plate. The 7-like heat dissipation plate has a cover plate next to the groove. The cover plate is attached to an adhesive strip of the light guide plate. The present invention can be assembled conveniently and quickly.

1 Claim, 6 Drawing Sheets

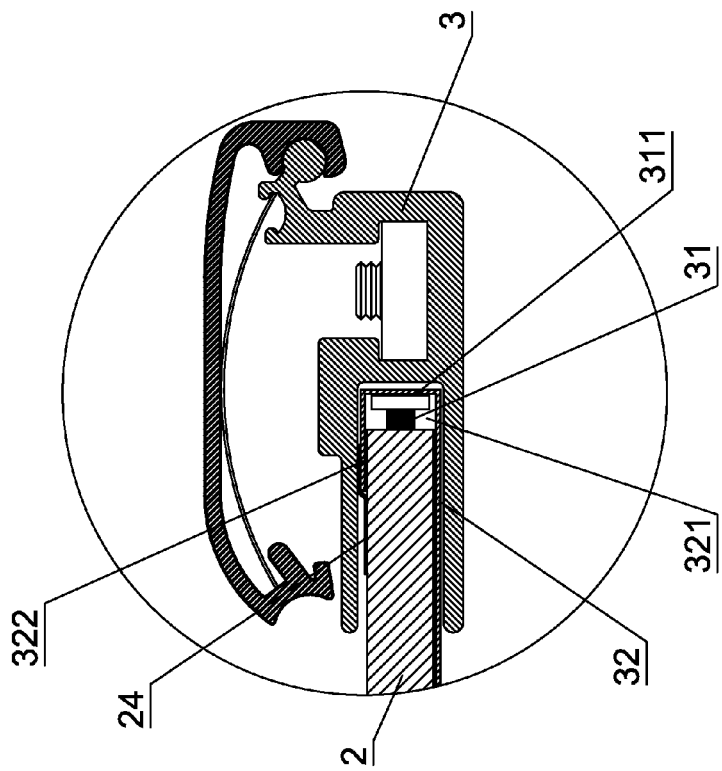
Fig. 3-A
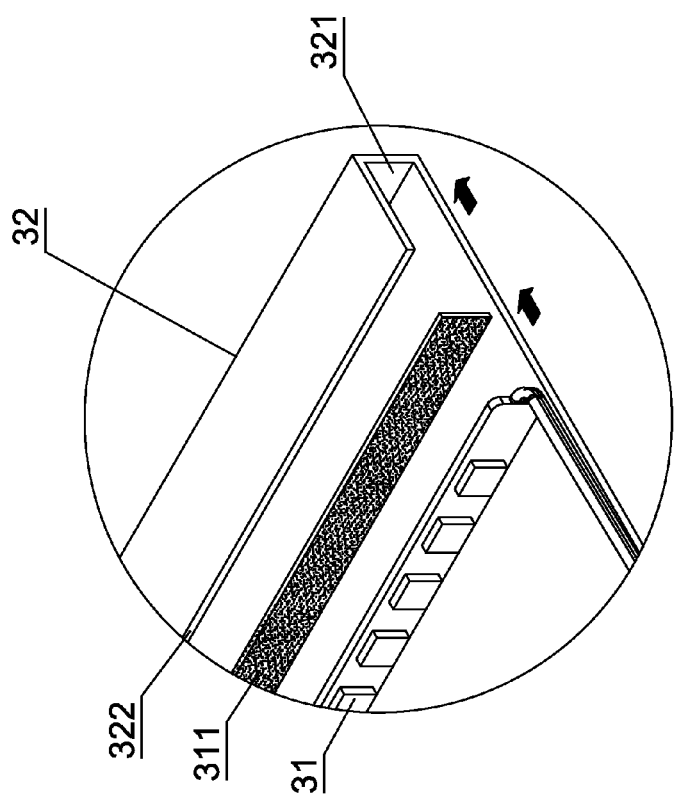
Fig. 1-A

LED DISPLAY FRAME STRUCTURE

BACKGROUND OF THE INVENTION

1. Field of the Invention

The present invention relates to an LED display frame structure, and more particularly to an LED display frame structure comprising a light guide plate and a heat dissipation frame. At least one side of the light guide plate is provided with an LED strip and a 7-like heat dissipation plate. The present invention can be assembled quickly.

2. Description of the Prior Art

As shown in FIG. 4 through FIG. 6, a conventional LED display frame 4 comprises a light guide plate 41. The light guide plate 41 comprises a diffusion film 411, a light reflection plate 412 and a reflection sheet 413 which are laminated in sequence. A side frame 42 is connected to the periphery of the light guide plate 41. At least one side of the light guide plate 41 is provided with an LED strip 421. The back of the LED strip 421 is provided with two elastic washers 422. The LED strip 421 is received in a groove 4231 of an L-shaped plate 423. The L-shaped plate 423 is inserted in the side frame 42. The LED strip 421 is connected in a press way, which may slip or displace. The LED strip 21 doesn't have a heat dissipation structure. The assembly of the LED strip requires much time and work. Accordingly, the inventor of the present invention has devoted himself based on his many years of practical experiences to solve these problems.

SUMMARY OF THE INVENTION

The primary object of the present invention is to provide an LED display frame structure which comprises a light guide plate and a heat dissipation frame. The light guide plate comprises a diffusion film, a light reflection plate and a reflection sheet which are laminated. The heat dissipation frame is mounted around the periphery of the light guide plate. At least one side of the light guide plate is provided with an adhesive strip. The at least one side of the light guide plate is provided with an LED strip. The LED strip is provided with a two-sided adhesive strip to be attached to a groove of a 7-like heat dissipation plate. The 7-like heat dissipation plate has a cover plate next to the groove. The cover plate is attached to the adhesive strip of the light guide plate. The LED strip is attached to the groove of the 7-like heat dissipation plate. The cover plate of the 7-like heat dissipation plate is attached to the adhesive strip of the light guide plate. The LED strip holds against the at least one side of the light guide plate to generate even light through the light guide plate. The present invention can be assembled conveniently and quickly and can secure the light guide plate, enhancing the heat dissipation efficiency and prolonging the LED life.

BRIEF DESCRIPTION OF THE DRAWINGS

FIG. 1-A is an enlarged view showing the LED strip according to the preferred embodiment of the present invention;

FIG. 3-A is a sectional view showing according to the preferred embodiment of the present invention;

DETAILED DESCRIPTION OF THE PREFERRED EMBODIMENTS

Embodiments of the present invention will now be described, by way of example only, with reference to the accompanying drawings.

Figure 1:
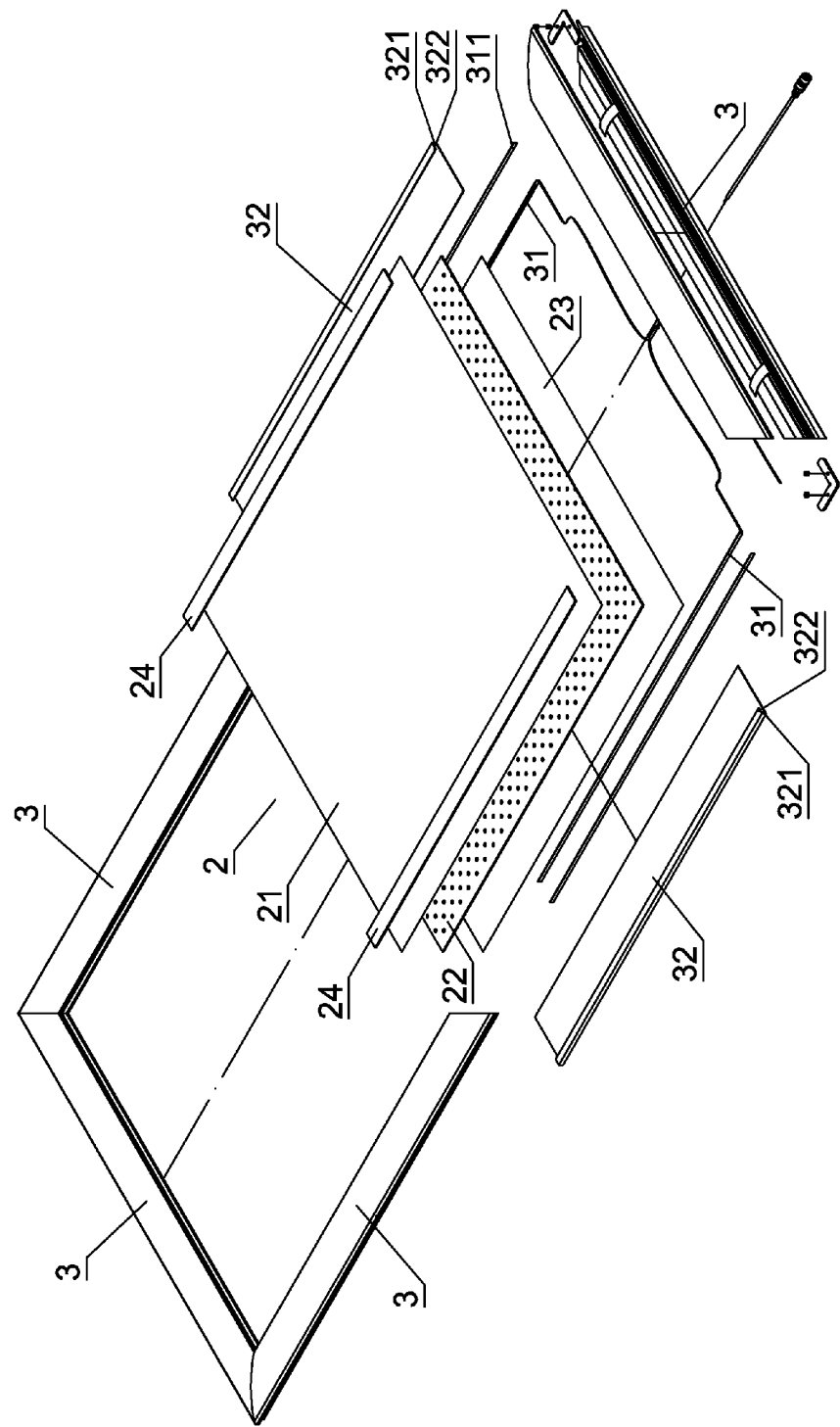
FIG. 1 is an exploded view according to a preferred embodiment of the present invention.
Figure 2:
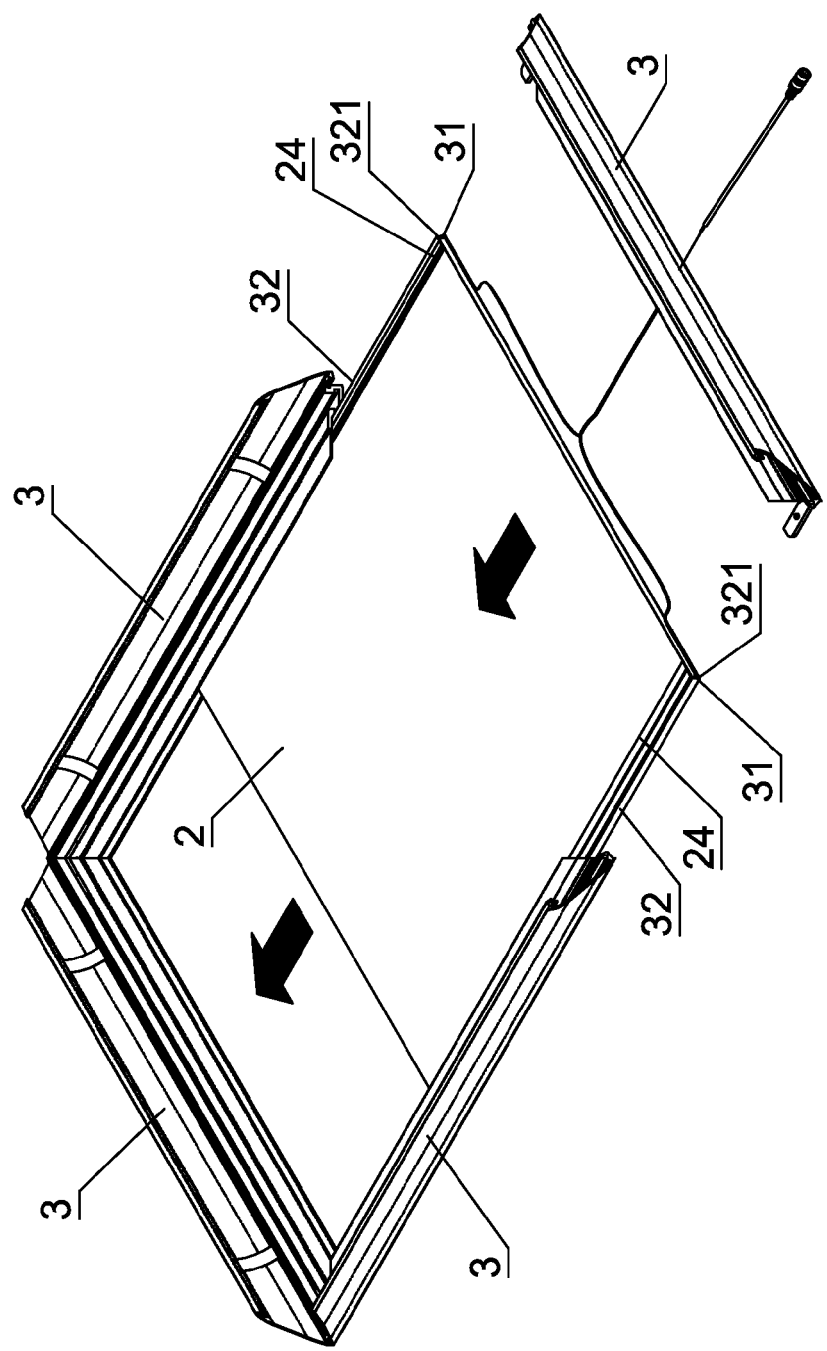
FIG. 2 is a schematic view showing assembly of the preferred embodiment of the present invention.

As shown in FIG. 1, FIG. 2 and FIG. 2A, the LED display frame structure according to a preferred embodiment of the present invention comprises a light guide plate 2 and a heat dissipation frame 3.

The light guide plate 2 comprises a diffusion film 21, a light reflection plate 22 and a reflection sheet 23 which are laminated in sequence. The light guide plate 2 is not the main feature of the present invention, and won't be described in detail hereinafter. At least one side of the light guide plate 2 is provided with an LED strip 31. An adhesive strip 24 is provided on the side of the light guide plate 2.

The heat dissipation frame 3 is mounted around the periphery of the light guide plate 2. The back of the LED strip 31 at the side of the light guide plate 2 is provided with a two-sided adhesive strip 311 to be attached to a groove 321 of a 7-like heat dissipation plate 32 made of aluminum. The LED strip 32 leans against the side of the light guide plate 2. The 7-like heat dissipation plate 32 has a cover plate 322 next to the groove 321. The cover plate 322 is attached to the adhesive strip 24 of the light guide plate 2. Accordingly, the present invention can be assembled quickly and stably to enhance heat dissipation efficiency and to prolong LED life.

Figure 3:
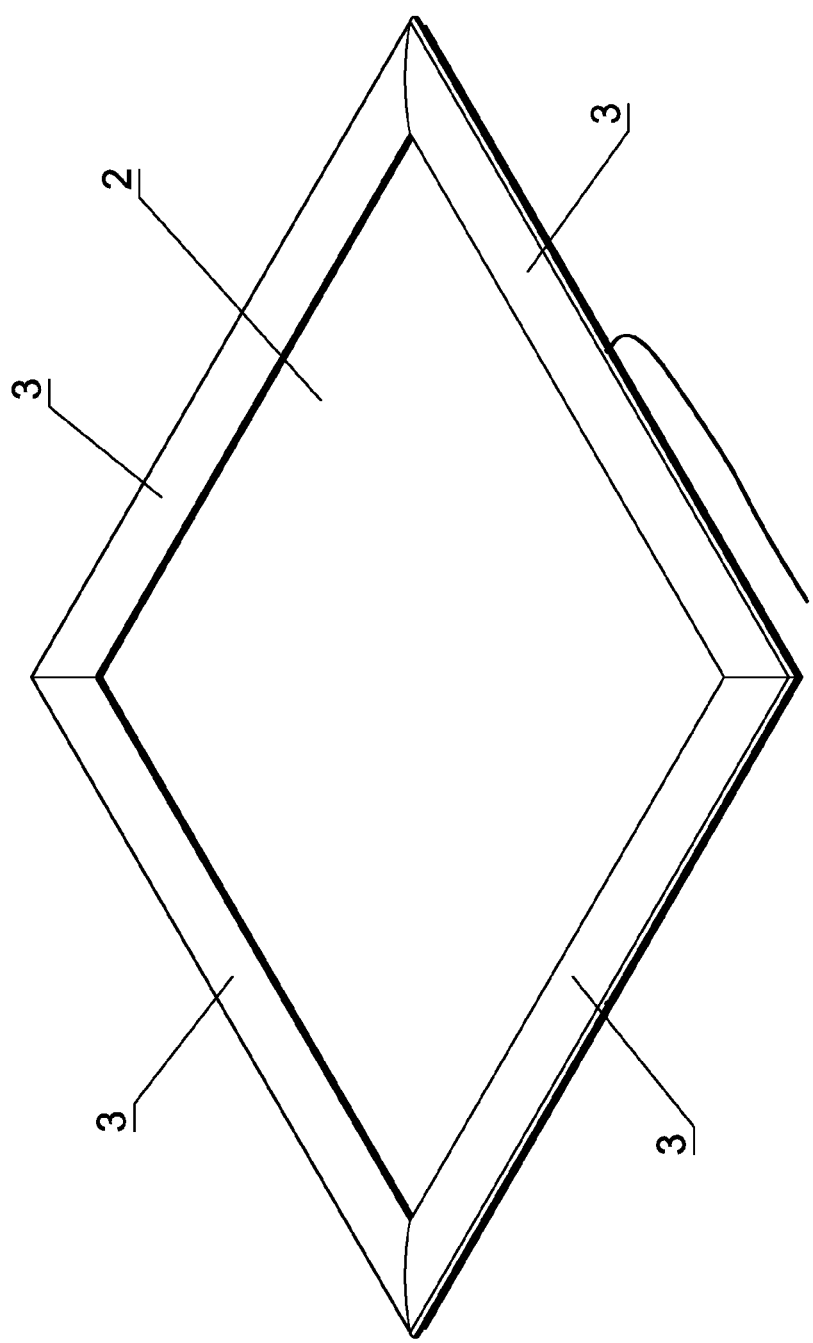
FIG. 3 is a perspective view showing according to the preferred embodiment of the present invention.
Figure 4:
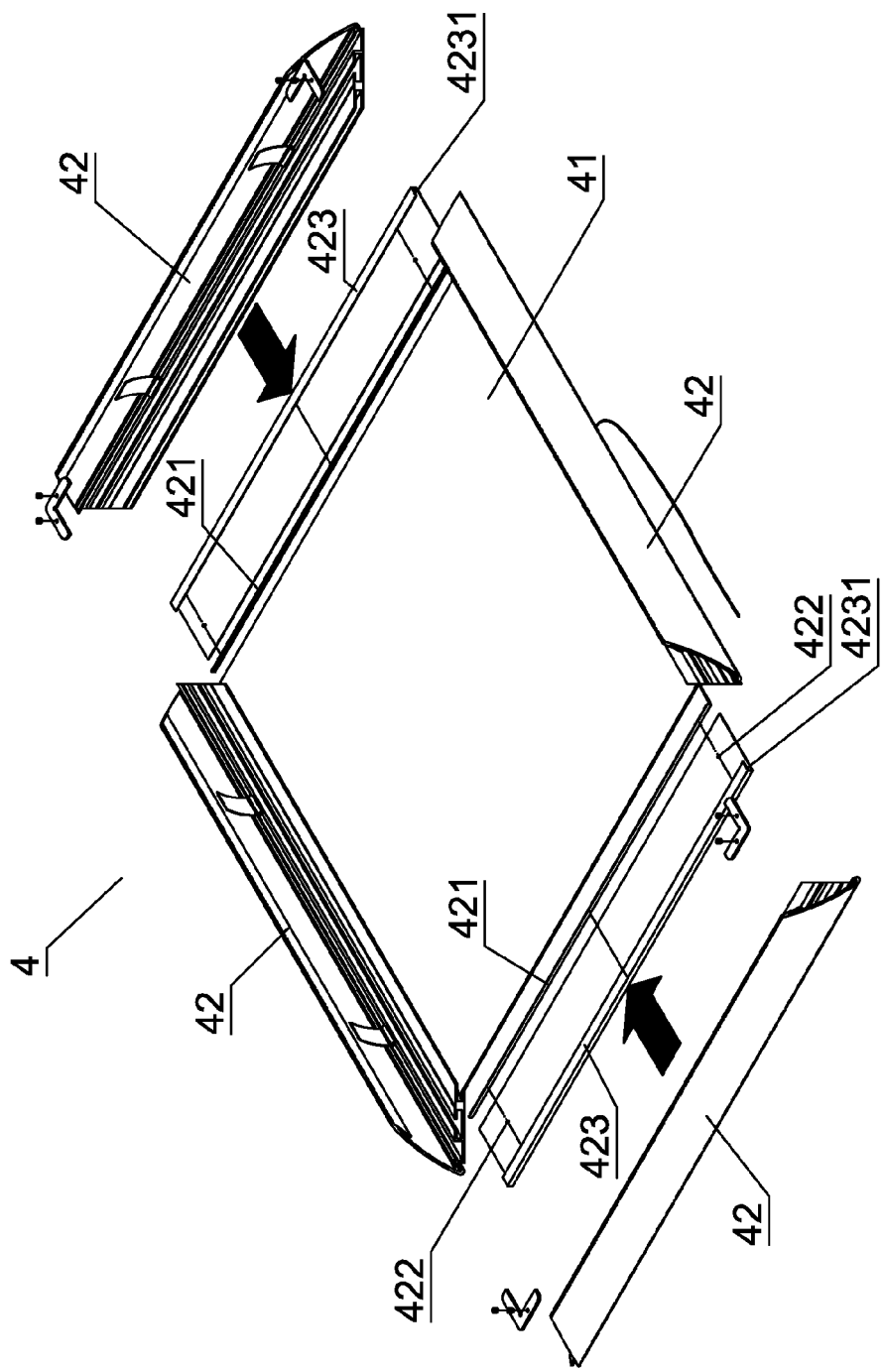
FIG. 4 is an exploded view of a conventional LED display frame.
Figure 6:
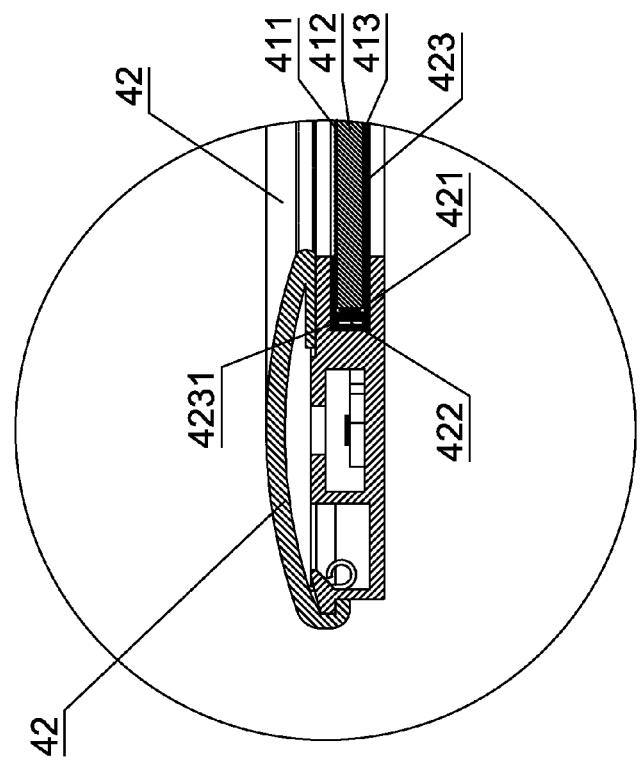
FIG. 6 is a sectional view of the conventional LED display frame.
Figure 5:
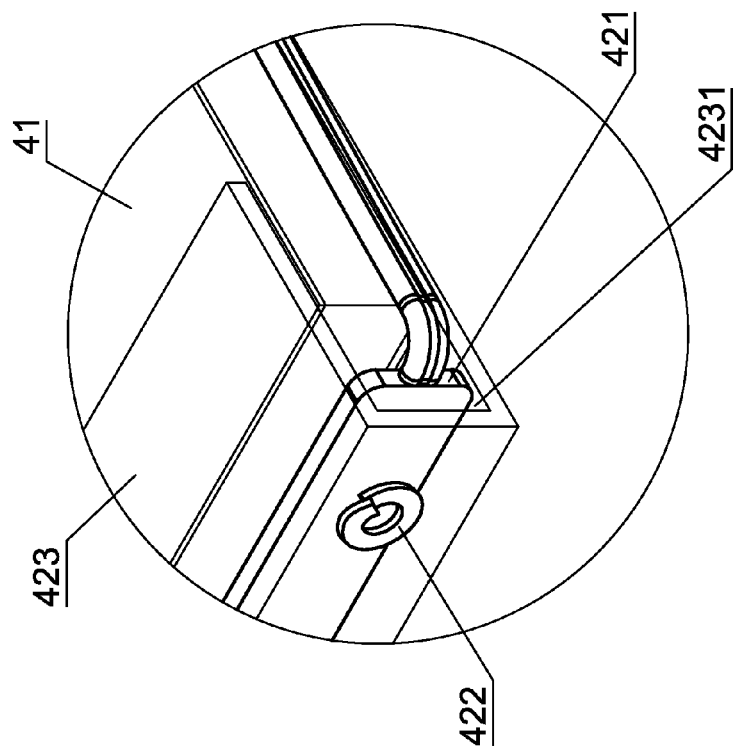
FIG. 5 is an enlarged view of the conventional LED display frame.

As shown in FIG. 2, FIG. 3 and FIG. 3-A, the heat dissipation frame 3 is mounted on the periphery of the light guide plate 2 which is composed of the diffusion film 21, the light reflection plate 22 and the reflection sheet 23. Two LED strips 31 are respectively attached to the groove 321 of the 7-like heat dissipation plate 32 with the two-sided adhesive strip 311. The cover plate 322 of the 7-like heat dissipation plate 32 is connected to the top and bottom sides of the light guide plate 2. The adhesive strip 24 is adhered to the junction of the edge of the cover plate 322 and the light guide plate 2. The LED strip 31 holds against the side of the light guide plate 2 to generate even light through the light guide plate 2. The present invention provides a convenient assembly.

Accordingly, the present invention can be assembled conveniently and quickly and can secure the light guide plate 2, enhancing the heat dissipation efficiency and prolonging the LED life.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An LED display frame structure, comprising a light guide plate and a heat dissipation frame, the light guide plate comprising a diffusion film, a light reflection plate and a reflection sheet which are laminated, the heat dissipation frame being mounted around the periphery of the light guide plate, and characterized by:

at least one side of the light guide plate being provided with an adhesive strip;

the at least one side of the light guide plate being provided with an LED strip, the LED strip being provided with a two-sided adhesive strip to be attached to a groove of a 7-like heat dissipation plate, the 7-like heat dissipation plate having a cover plate next to the groove, the cover plate being attached to the adhesive strip of the light guide plate;

thereby, the LED strip being attached to the groove of the 7-like heat dissipation plate, the cover plate of the 7-like heat dissipation plate being attached to the adhesive strip of the light guide plate, the LED strip holding against the at least one side of the light guide plate to generate even light through the light guide plate.

* * * * *